United States Patent [19]
Wootton

[11] Patent Number: 5,366,521
[45] Date of Patent: Nov. 22, 1994

[54] TREE TRUNK SMOOTHING DEVICE

[76] Inventor: John W. Wootton, 739 S. Pennsylvania Ave., Glendora, Calif. 91740

[21] Appl. No.: 19,618

[22] Filed: Feb. 19, 1993

[51] Int. Cl.⁵ .............................................. A01G 31/00
[52] U.S. Cl. .................................. 47/1.01; 144/208 K
[58] Field of Search ............. 47/1 B; 144/2 Z, 208 K; 51/241 S

[56] References Cited

U.S. PATENT DOCUMENTS

| | | |
|---|---|---|
| 2,477,922 | 8/1949 | Emery et al. |
| 2,541,767 | 2/1951 | Jones . |
| 2,581,478 | 1/1952 | Grasham . |
| 2,727,335 | 12/1955 | Susil . |
| 2,871,620 | 2/1959 | Bathe . |
| 3,117,401 | 1/1964 | Talley . |
| 3,545,509 | 12/1970 | Baxter .................................. 144/309 |
| 4,355,672 | 10/1982 | Gaertringen ........................ 144/208 |
| 4,735,244 | 4/1988 | Kacer .................................. 144/2 Z |
| 5,056,258 | 10/1991 | Quinn .................................. 47/1.01 |

*Primary Examiner*—Henry E. Raduazo
*Attorney, Agent, or Firm*—Christie, Parker & Hale

[57] ABSTRACT

A device is set forth for trimming branch and frond segments from trees which includes a frame positionable about the trunk and a mechanism disposed on the frame for driving the frame upwardly and downwardly along the trunk. A carriage is carried by the frame and encircles the trunk. Trimming blades are mounted on the carriage in a horizontally opposed chordal relationship and are biased to maintain engagement with the trunk. As the frame is driven upwardly, a motor rotates the carriage causing the blades to remove the branch and frond segments from the tree.

5 Claims, 4 Drawing Sheets

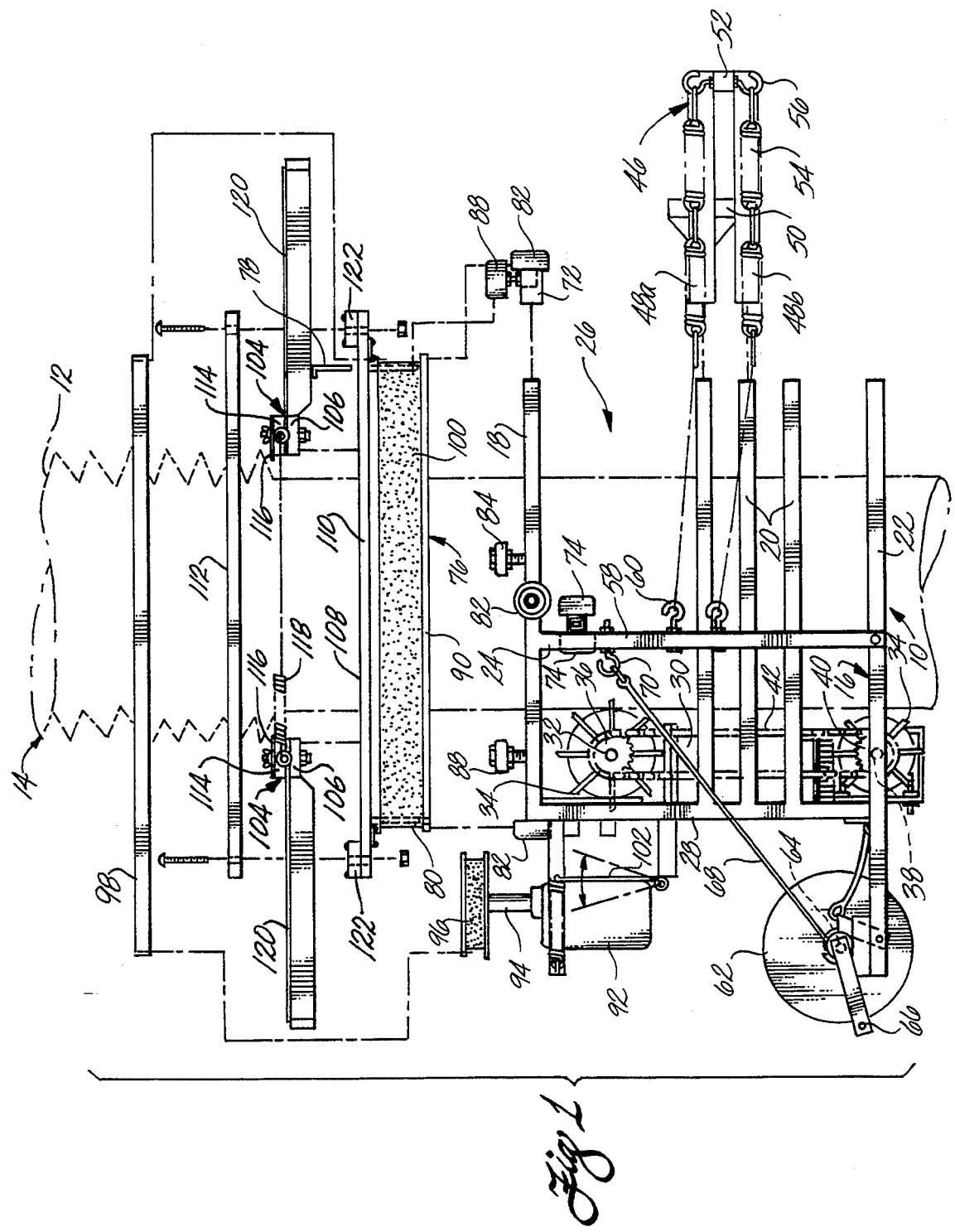

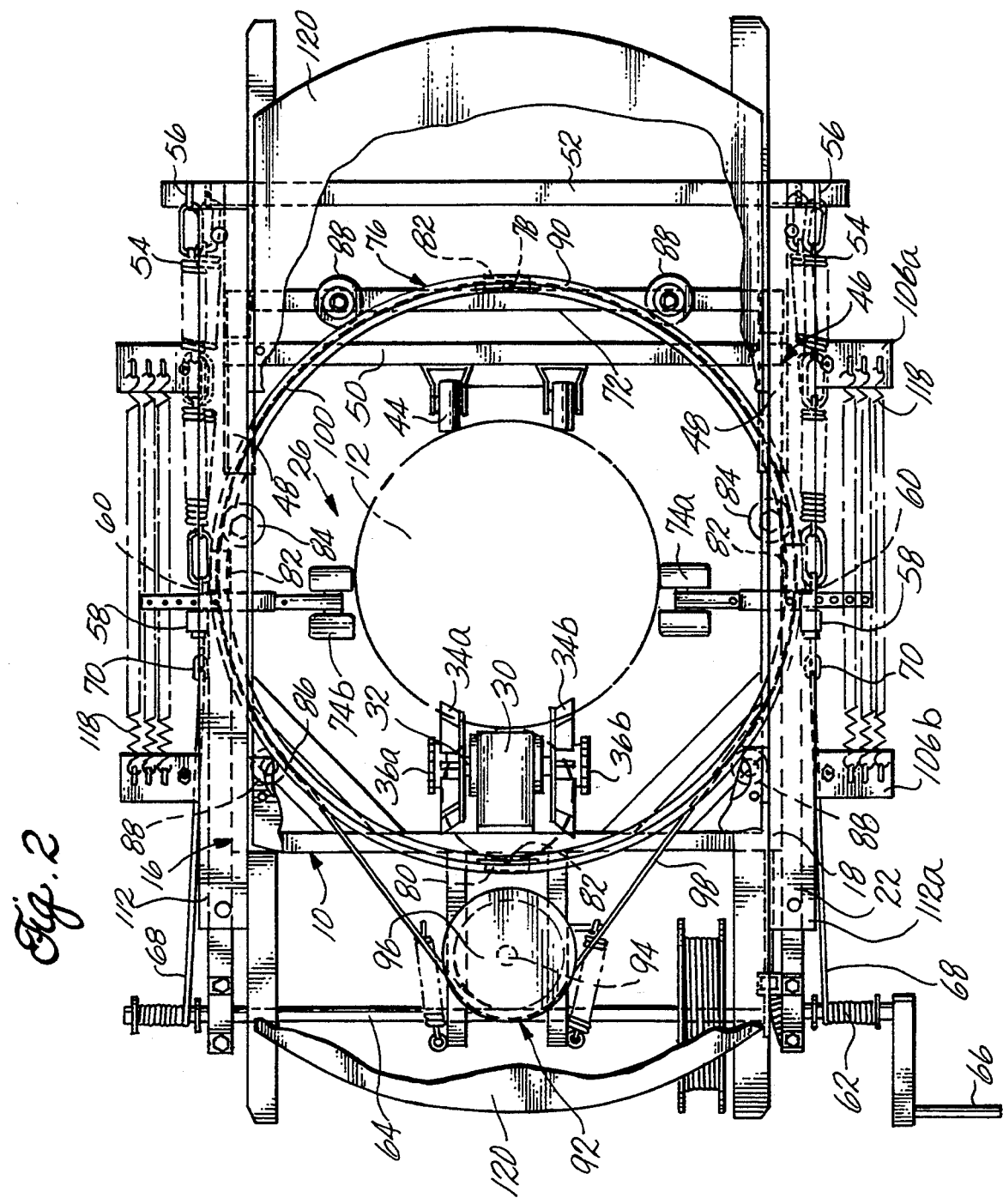

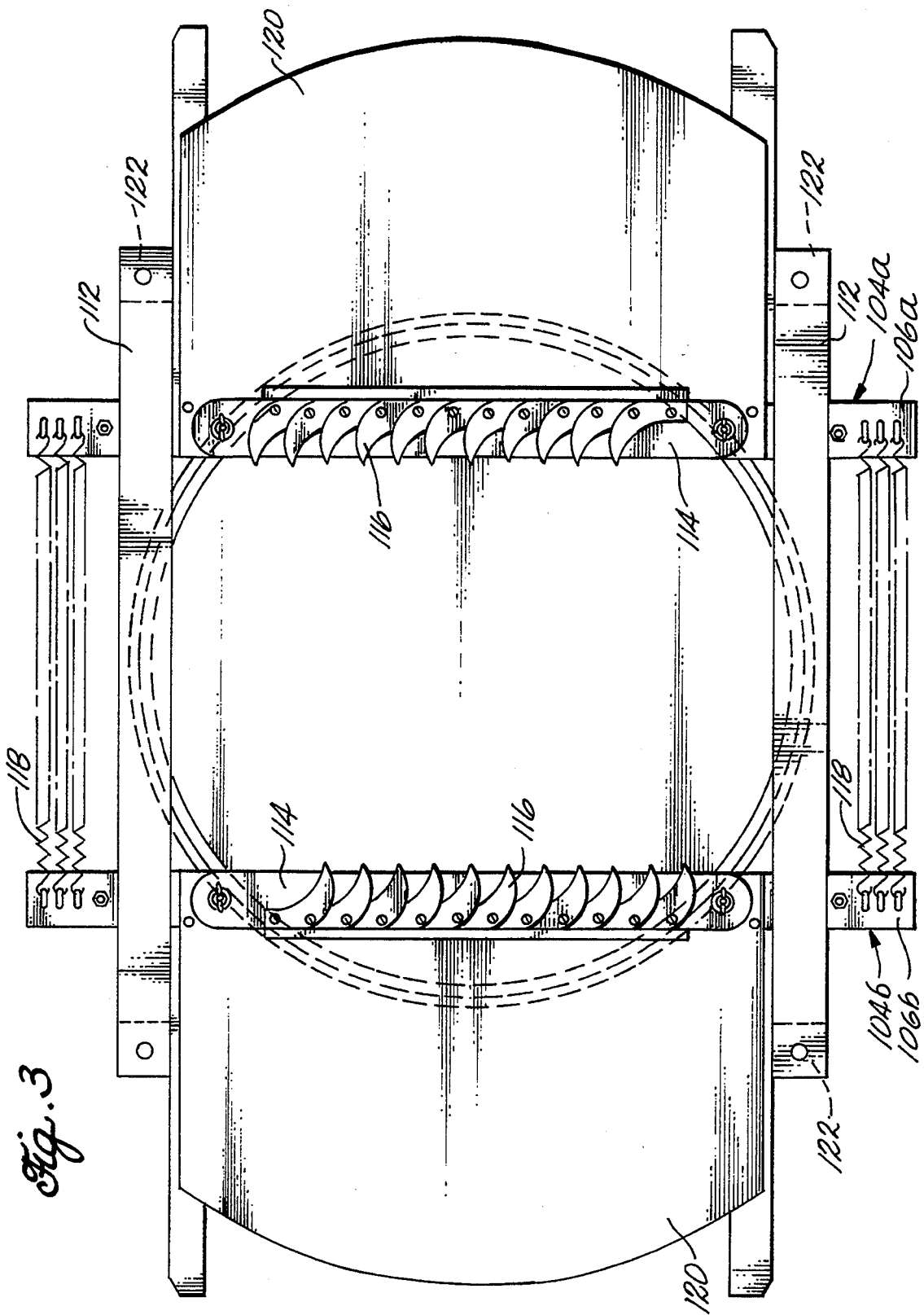

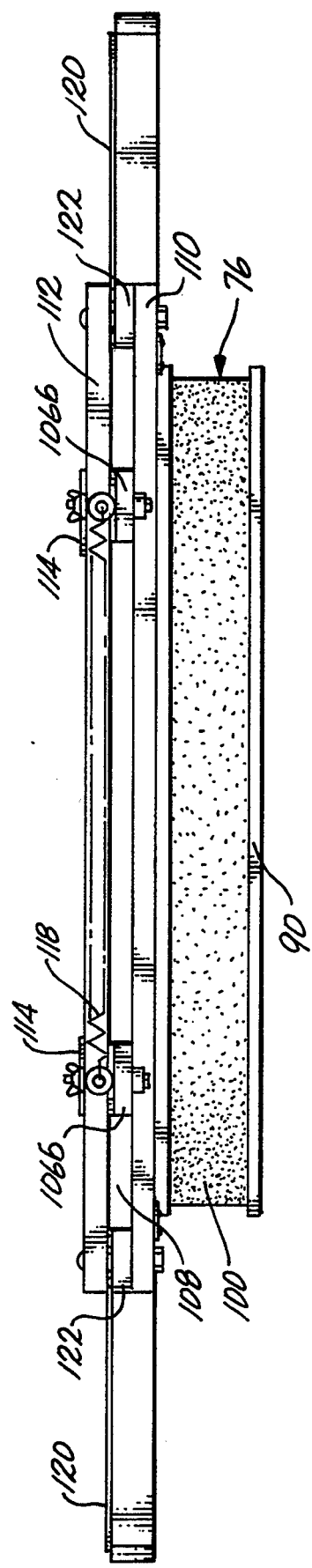

TREE TRUNK SMOOTHING DEVICE

FIELD OF THE INVENTION

This invention relates to devices for smoothing the trunks of trees after the blades, fronds, etc. have been removed.

BACKGROUND OF THE INVENTION

As trees such as palm trees grow, new fronds sprout at the top and old fronds wither and die. When old fronds die and are cut off, this results in dead frond segments, hereinafter called "collars" or "frond segments", remaining on the trunk presenting an unsightly appearance and an inviting nest for insects and rodents. Dirt and detritus also tend to collect at the collar cluster. In the past, it has been the practice to manually trim the collars close to the trunk from palm tree trunks to enhance the beauty of the tree and prevent the occurrence of the above problems.

Manual removal of collars is slow, tedious work and, due to the heights involved, also presents a safety risk. It has also been known to construct devices for trimming the old fronds from trees. Susil, U.S. Pat. No. 2,727,335, discloses such a device. Such prior devices however are not designed to remove collars from the trunks of trees to provide a smooth trunk and branch segments. There are also other considerations. Trees vary from tree to tree in diameter. An ability to conform to the changing girth of a tree in as simple a device as possible to enhance its reliability and performance is highly desirable.

Quinn, U.S. Pat. No. 5,056,258, discloses a frond trimming device that has such an ability to conform to the changing girth of a tree. The device comprises a frame member positioned around the tree that serves to drive a blade containing carriage member up the tree. As the frame member slowly advances up the tree the carriage member is rotated about the tree causing a pair of horizontally opposed pivoting blades to remove frond segments from the tree. However, this device does not provide the ultimate solution.

The disadvantage in the device disclosed in U.S. Pat. No. 5,056,258 lies in its pivoting blade arrangement and its inability to produce a consistent result. Although the pivoting blade arrangement does permit use of the device with a tree of varying girth, it does not work well with trees having a small diameter. Upon the installation of the blade arrangement about a tree of smaller, due to the pivoting arrangement of the blades, there is necessarily less spring tension against each blade to keep it in contact with the tree surface. Additionally, when trimming smaller trees there is more of an opportunity for the device to move out of alignment, causing the tree to occupy a position within the carriage that is not in contact with the blades. In either case, the device ultimately fails to produce a consistently trimmed tree.

It is, therefore, highly desirable to provide an apparatus for trimming collars or frond segments from palm trees that can adjust to the different girth of palm trees. It is also desirable that this apparatus contain a blade arrangement capable of accommodating and producing uniform results on smaller diameter trees.

SUMMARY OF THE INVENTION

Toward this end, the present invention provides an apparatus for trimming collars or frond segments from palm trees which is simple in design and adjusts to the changing or different girth of palm trees to neatly trim the collars and smooth the trunk over the entire height of the tree. This device is an improvement on Quinn U.S. Pat. No. 5,056,258, accordingly, U.S. Pat. No. 5,056,258 is hereby incorporated by reference. This device contains an improved horizontally opposed blade arrangement that imparts sufficient tension upon the blade members to keep them in contact against the surface of smaller trees. This blade arrangement also contains a larger cutting surface that produces consistent trimming results regardless of the trees positioned within the device.

Accordingly, a device for trimming the collars and smoothing palm tree trunks is set forth which includes an articulated frame positionable about the base of the palm tree trunk. Means are disposed on the frame for engaging the trunk and driving the frame upwardly and downwardly along the trunk. Preferably, the driving means are embodied as a plurality of driven wheels at one side of the frame which engage with and track against the trunk. Opposite the wheels are means for urging the wheels to maintain said traction with the trunk. Biased springs interacting between roller sets bearing against the tree trunk opposite the wheels may comprise the aforesaid urging means. A pair of guide wheels are slid from opposing locations on the frame against the trunk to control side-to-side translation of the trunk within the device.

A carriage is mounted on the frame to encircle the trunk when the frame is so positioned. Suitable means such as an electric motor on the frame are coupled to and rotate the carriage circumferentially about the trunk. Trimming means for removing collars and smoothing the trunk including a plurality of blade members disposed on the carriage in an opposed relationship that are resiliently biased into engagement with the trunk to maintain the trunk trapped therebetween. As the carriage rotates so do the blade members to trim collars from the trunk. Operating the driving means causes the device to climb or descend on the trunk, removing collars along its length as it moves up or down. The biased blade members maintain cutting contact with the tree even though the girth of the trunk may change.

The device according to the present invention exhibits several features and advantages. Firstly, the device is of simple construction and does not require complicated hydraulics or other driving means. Further, despite its simplicity, the device is suited to remove collars from palm trees of various girths and even those wherein the girth changes over the height of the tree. The blade members are continually urged to trap the trunk therebetween and, as the carriage is rotated, trim the collars therefrom.

Brief Description of the Drawings

These and other features and advantages will become appreciated as the same becomes better understood with reference to the specification, claims and drawings wherein:

FIG. 1 is a side view of a preferred embodiment of the present invention attached to a palm tree trunk shown in phantom;

FIG. 2 is a top view of the preferred embodiment illustrating the arrangement of the blade members, carriage and frame attached to a palm tree shown in phantom;

FIG. 3 is a top view of the preferred embodiment illustrating the blade arrangement mounted to the carriage; and FIG. 4 is a side view of the preferred embodiment illustrating the blade arrangement mounted to the carriage.

DETAILED DESCRIPTION OF THE INVENTION

Turning to the drawings, FIGS. 1-4 show the preferred embodiment of the device 10 according to the present invention attached to the trunk 12 of a palm tree to trim collars 14 therefrom. As indicated, the device 10 is attached to the base of trunk 12 and is operated to climb the trunk 12 and trim frond segments 14 therefrom. When trimming is complete, the device 10 is operated to descend the trunk of the tree and is thereafter removed from the tree.

The device 10 has a frame 16 which may be parallelepipedal in configuration and of a size to encircle the trunk 12 of the tree. Frame 16 has rectangular top supports 18, middle supports 20 and bottom supports 22. These supports are spaced apart and held rigid by vertically arranged braces 24. At one side thereof shown as 26 in FIG. 1, the frame 16 is adapted to be partially disassembled to permit the frame to be positioned about the trunk 12. Once positioned, the disassembled components of the frame 16 are reassembled into the configuration shown in FIG. 1 about the trunk 12.

Disposed on the frame are means for driving the device 10 to climb and descend trunk 12. For this purpose, the frame 16 includes, opposite side 26, vertical, parallel, spaced support bars 28 defining a mounting surface for an electric motor 30 having a double output shaft 32 as best shown in FIG. 2. Mounted to each end of the output shaft 32 is a toothed climbing wheel 34a, 34b and a drive sprocket 36a, 36b. The climbing wheels are of a larger diameter than the drive sprockets and are mounted at the inside position of the output shaft while the smaller diametered drive sprockets are mounted at each end of the output shaft. The climbing wheels 34 are adapted to engage and maintain traction with the trunk 12. As shown in FIG. 1, axle 38 is positioned below electric motor 30 and mounted to the vertical support bar 28. Climbing wheels 34c, 34d, are mounted at the inside position of each axle side while driven sprockets 40a, 40b, are mounted to the distal ends of the axle. Climbing wheels 34c, 34d, and driven sprockets 40a, 40b, are identical to climbing wheels 34a, 34b, and drive sprockets 36a, 36b, respectively. Drive sprockets 36a, 36b, drive chains 42 which engage the driven sprockets 40a, 40b, respectively, which results in driving both climbing wheel pairs 34a, 34b, 34c, 34d, in synchronism. Climbing wheels 36 are adapted to engage and maintain traction with the trunk 12. The end result is that as motor 30 is driven either forward or reversely, the climbing wheels 36 are caused to also rotate forward or reversely to cause device 10 to climb or descend the trunk 12.

To maintain the climbing wheels 36 and the teeth thereof in engagement with the trunk 12, the device 10 also includes urging means for exerting a resilient bias on the drive means producing engagement between the trunk and the drive means. These urging means include a pair of rollers 44 that are mounted to a sub-frame 46 of which one end is slidably mounted to the middle supports 20, as shown in FIG. 1. The rollers 44 are slightly angled toward each other to engage and mate with the curvature of trunk 12. The sub-frame 46 includes horizontal arms 48a, 48b, one end of which slidably engage over the ends of each middle support 20. Cross bar 50 joins each horizontal arm 48a, 48b, at its midpoint and provides the mounting site for rollers 44.

A bias bar 52 joins each horizontal arm 48a, 48b, at its other end. A biasing means in the form of a spring 54 is attached at one end to a spring mount 56 located on the top and bottom of each end of the bias bar 52. Each spring 54 is attached at its other end to a vertical pull bar 58 positioned near each horizontal arm 48a, 48b. The springs 54 are attached to spring mounts 60 located near the top end of each vertical pull bar 58. Each pull bar 58 is pivotally mounted at its bottom end to a respective bottom support 22. A pulling means in the form of a wench 62 is attached to the top of the rearmost portion of the bottom support 22. An axle 64 connects the wench 62 to the top of the adjoining bottom support 22. A handle 66 is attached to the wench 62. A rope 68 is used to attach the wench 62 on each bottom support 22 to each pull bar 58. One end of each rope 68 is attached to a mount 70 located at the top of each pull bar 58 while the other end of each rope 68 is fastened to each end of the axle 64.

Turning handle 66 of the wench 62 causes the rope 68 to exert tension on the pull bar 58 which in turn biases the springs 54 and causes the rollers 44 of the sub-frame 46 to bear against the trunk 12. Once sufficient bias is applied to the sub-frame 46 to urge the climbing wheels 34 into and maintain engagement with trunk 12, the wench 62 is locked into position. Accordingly, as the motor 30 is driven, the driving means including climbing wheels 34 engage and maintain traction with the trunk to drive the device 10 upwardly and downwardly along the trunk 12 as further guided by rollers 44.

After the sub-frame 46 has been sufficiently biased against the truck 12 a cross member 72 is slidably engaged over each top support 18 and bolted into position, see FIGS. 1 and 2. Guide wheel pairs 74a, 74b, are slidably mounted to the inside of the top supports 18 in an opposed manner such that each wheel faces inward toward the center of the frame 16, as best shown in FIG. 2. The guide wheel pairs 74a, 74b, are oriented having a horizontal axes so that they rotate in the vertical direction. Once the frame 16 is in position about the trunk 12 the guide wheel pairs 74a, 74b, are slid inward away from the frame 16 and toward the trunk 12. Each guide wheel pair 74a, 74b, is locked into position once it contacts the surface of the trunk 16. Accordingly, climbing wheels 34a, 34b, 34c, 34d, and rollers 44 control the forward-to-rear translation of the frame 16 while guide wheel pairs 74a, 74b, control the side-to-side translation of the frame 16 during operation.

Supported at the top support 18 for rotation is a circular carriage 76 which like the frame 16 is adapted to encircle trunk 12. At a pin 78, the carriage 76 can be released and opened pivoting about hinge 80 to receive trunk 12 therein, see FIG. 2. When the frame 16 has been positioned about the trunk 12, carriage 76 is also reconnected so as to encircle trunk 12. Carriage 76 is reconnected into its circular configuration during operation of the device by installing pin 78 as shown in FIG. 2.

The carriage 76 rests on wheels 82a-d, journaled at three points on the top support 18 and one point at the cross member 72, see FIGS. 1 and 2. Wheels 82a-d are mounted so that they rotate in the vertical position. The carriage 76, when rotated as described below, rotates the top of the wheels 82a–d.

To further guide and support the carriage 76 for rotation, the device 10 includes guide wheels 84a, 84b, distributed so as to bear against the inside surface of the carriage 76 as shown in FIG. 2. Guide wheels. 84a, 84b, are mounted in opposed positions to the top support 18. As stated above, the guide wheels 84a, 84b, bear against the inside surface of the carriage 76 to guide and support its rotation and prevent side-to-side translation during the operation of the device 10. As best shown in FIG. 2, carriage 66 includes an annular lip 86 which is disposed axially below the guide wheels 84a, 84b, and engages the same to prevent upward movement of the carriage 76 relative to the frame 16.

Guide wheels 88a–d, are positioned about the outside circumference of the carriage 76, see FIGS. 1 and 2. Wheels 88a, 88b, are mounted at the rear corners of the top support 18 while wheels 88c, 88d, are mounted on each end of the cross member 72. Guide wheels 88a–d, bear against the outside surface of the carriage 76 to guide and support its rotation and prevent forward-to-rear or side-to-side translation during operation of the device 10. As best shown in FIG. 2, carriage 76 includes an annular lip 90 which is disposed axially below the guide wheels 88a–d, and engages the same to prevent upward movement of the carriage 76 relative to the frame.

As described above, downward relative movement is prevented by the wheels 82a, 82b, see FIGS. 1 and 2. As can be appreciated, the wheels 84a, 84b, and guide wheels 88a–d, guide and journal the carriage for rotation about the trunk 12 of the tree.

To rotate the carriage 76, an electric motor 92 is mounted to the rear side of the vertical, parallel support bars 28. The electric motor may be of any suitable type, including a heavy duty electric motor. Motor 92 has a shaft 94 to which is keyed to at least one sheave 96. Sheave 96 engages a belt 98 which is wrapped about the carriage 76 and received at track 100 thereof as indicated in FIG. 1. Accordingly, when the motor 92 is energized, the sheave 96 rotates driving the belt 98 which, in turn, rotates the carriage 76. Track 100 retains the belt 98 in proper alignment and coupled with the carriage 76 during the drive rotation thereof. Guide wheels 84a, 84b, and 88a–d, support the carriage 76 to permit the endless belt 98 to be tensioned. To adjust the tension of the belt 98, motor 92 may be mounted on an adjustable mount 102 to permit its adjustable movement toward and away from the vertical, parallel support bars 28.

To trim the frond segments 14 from the tree as a result of the rotation of the carriage 76, a pair of horizontally opposed blade members 104a, 104b, are slidably attached to the carriage 76. As best shown in FIG. 3, each blade member 104a, 104b, comprises a blade arm 106a, 106b, positioned across the diameter of the carriage 76. Blade arms 106a, 106b, each slidably reside within a slot 108a, 108b, formed between a bottom guide member 110a, 110b, and a top guide member 112a, 112b, see FIG. 4. Bottom guide members 110a, 110b, are attached opposite each other to the top of the circular carriage 76 at a position tangent to its circumference, see FIG. 1. Attached to each blade arm 106a, 106b, is a blade bar 114a, 114b, containing a plurality of blades 116. Each blade bar 114a, 114b is mounted to a blade arm 106a, 106b, in a horizontally opposed manner so that the blades 116 of each blade member 104a, 104b are directed toward each other, see FIGS. 3 and 4.

As shown in FIGS. 1–4, blade members 104a, 104b, are resiliently biased together by a plurality of springs 118 connecting the ends of each adjoining blade arm 106a, 106b together. The springs 118 urge blade members 104a, 104b, toward the center of the carriage 76 and into the tree trunk 12. The desired degree of tension applied to the trunk 12 by the blade members 104a, 104b, can be adjusted by either adding or removing springs 118. Attached to each blade member 104a, 104b, is a shield 120, which serves to prevent the trimmed ground debris from falling down and obstructing the operation of the climbing wheels 34 or rollers 44, see FIG. 3.

Each blade member 104a, 104b, is slidably positioned on top of the carriage 76 and resiliently biased by springs 118 to accommodate the changing diameter of a tree trunk 12. As the diameter increases the blade members 104a, 104b, are pushed outwardly away from each other. End blocks 122 are positioned between each end of the bottom and top guide members 110a, 110b, and 112a, 112b, respectively, see FIGS. 1 and 4. Blade members 104a, 104b, travel in a reciprocal manner outward and away from each other until the blade arms 106a, 106b, contact each end block 122 that terminate slots 108a, 108b. Accordingly, end blocks 122 define the maximum diameter of tree trunk 12 which can be accommodated by the device 10.

As can be appreciated with particular reference to FIG. 3, the blade members 104a, 104b are adapted for reciprocal slidable movement toward and away from the center of the device 10 and its rotating carriage 76. As carriage 66 rotates, blade members 104a, 104b are free to slide within slots 108 created between bottom guide members 110a, 110b, and top guide members 112a, 112b, against the bias of springs 118 to maintain blades 116 in engagement with the trunk 12 of the tree. As the diameter of the tree changes, blade members 104a, 104b, cooperatively slide in a reciprocal manner within the slots 108 accommodating such change to remove the frond segments 14 therefrom.

As shown in FIG. 1, The device 10 is attached to the trunk 12 of the tree in the following manner. Frame 16 is placed about the base of the trunk 12. Sub-frame 46 is slidably engaged with middle supports 20 and springs 54 are connected between spring mounts 56 of sub-frame 46 and spring mounts 60 of pull bar 58. A wench 62 is used draw the sub-frame 46 into contact with truck 12 by tensioning rope 68 attached to pull bar 58. Once the trunk 12 is trapped between rollers 44 contained in the sub-frame 46 and climbing wheels 34a–d, of the frame 16, wench 62 is locked into position applying bias by springs 54 to the sub-frame 46 to maintain contact with the trunk 12. Guide wheel pairs 74a, 74b, are slid inwardly from the top supports 18 until each contacts the trunk 12 and then locked into position, see FIG. 2.

Circular carriage 76 is mounted to frame 16 by removing pin 78 and hingably opening the carriage 76 to receive truck 12. Carriage 76 is placed on the top support 18 of frame 16 and positioned such that the inside annular lip 86 resides below wheels 84a, 84b, the bottom portion of the carriage 76 contacts wheels 82a–d, and the outer annular lip resides below wheels 88a, 88b, see FIG. 1. The carriage 76 is then locked closed by installing pin 78. Cross member 72 is slidably engaged over top supports 18 and locked into position when wheels 88a, 88b, contact the carriage 76. Belt 98 is positioned around the carriage track 100 and the sheave 96 and tensioned by adjustment of motor mount 102.

As shown in FIG. 1, blade members 104a, 104b, are positioned onto the bottom guide members 110a, 110b, so that the blades 116 of each blade member 104a, 104b, are directed toward each other. End blocks 122 are placed at each end of both bottom guide members 110a, 110b, and the top guide members 112a, 112b, are placed on top of their respective bottom guide members 110a, 110b. Both guide members are secured to each other by means of a nut and bolt arrangement sandwiching an end block 122 between each guide member end. The end blocks 112 being of sufficient thickness to permit freely slidable movement of blade members 104a, 104b, within the slots 108 created between the bottom and top guide members, 110a, 110b, and 112a, 112b, respectively, see FIGS. 1 and 4.

Blade members 104a, 104b, are moved inwardly toward the center of the device 10 until blades 116 are brought into contact with trunk 12. Springs 118 connect together each end of adjoining blade arms 106a, 106b, and provide the means for maintaining blade 116 contact with the trunk 16 as the diameter fluctuates.

Motor 30 is energized as is motor 90, causing the device 10 to begin to ascend the tree as carriage 76 rotates. Rotation of carriage 76 causes blades 116 to sever frond segments 14 from the tree as the device 10 progressively moves upwardly along trunk 12. When collars 14 have been severed along the length of the tree, motor 30 is reversely driven so that the device descends to the bottom of the tree where both motors 30, 90 are de-energized and the device 10 is removed from the tree.

While I have shown and described certain embodiments of the present invention, it is to be understood that it is subject to many modifications without departing from the spirit and scope of the claims set forth herein.

What is claimed is:

1. A device for trimming and smoothing a tree trunk comprising:
   a frame positionable about the trunk;
   means disposed on the frame for engaging the trunk, centering the device, and driving the frame upwardly and downwardly along said trunk;
   a generally circular carriage disposed on the frame to encircle the trunk;
   means for rotating the carriage about the trunk;
   trimming means for easily engaging branch segments extending from the tree trunk, including first and second blade members horizontally positioned on opposite sides of the carriage to form chords of a circle defined by the carriage and to bracket the trunk therebetween, each blade member comprising a blade arm slidably positioned in a non-pivoting manner within slots formed by top and bottom portions of the carriage to permit inward and outward reciprocating sliding movement of each blade arm within the slots;
   a plurality of cutting means mounted on each of said first and second blade arms, said cutting means being positioned to engage the trunk when said blade arms are horizontally slid into operating position adjacent the trunk; and
   means for urging the blade arms inward to engage the tree trunk, rotation of the carriage causing the cutting means to trim branch segments from the trunk of the tree to produce a clean, relatively smooth surface, wherein the urging means comprise spring biasing means connecting end portions of each opposed blade arm to produce said inward and outward reciprocating movement within the slots in a non-articulating manner toward and away from each other as the tree trunk decreases or increases in diameter.

2. The device of claim 1 wherein the spring biasing means are coil springs interconnected between each blade member.

3. The device of claim 1 wherein the rotating means includes an electric motor disposed on the frame and a belt coupling the carriage to the motor, energization of the motor driving the belt to rotate the carriage.

4. A device for trimming and smoothing a tree trunk comprising:
   a frame positionable about the trunk;
   means disposed on the frame for engaging the trunk, centering the device, and driving the frame upwardly and downwardly along said trunk;
   carriage disposed on the frame to encircle the trunk;
   means for rotating the carriage about the trunk;
   trimming means for easily engaging branch segments extending from the tree trunk, including a first and second blade member horizontally positioned on opposite sides of the carriage so as to bracket the trunk therebetween, each blade member comprising a blade arm positioned in a non-pivoting manner within slots formed by top and bottom portions of the carriage to permit inward and outward reciprocating sliding movement of each blade arm therein;
   a plurality of cutting means mounted on each of said first and second blade arms, said cutting means being positioned to engage the trunk when said blade arms are slid into operating position adjacent the trunk; and
   spring biasing means connecting end portions of each opposed blade arm for urging the blade arms to produce said inward and outward reciprocating movement within the slots in a non-articulating manner toward and away from each other as the trunk decreases and increases in size to cause the cutting means to engage the tree trunk, rotation of the carriage causing the cutting means to trim branch segments extending from the trunk of the tree to produce a clean, relatively smooth surface.

5. A device for trimming and smoothing tree trunks after the branches have been removed comprising;
   a frame positionable about the trunk;
   means disposed on the frame for engaging the trunk, centering the device, and driving the frame upwardly and downwardly along said trunk;
   a carriage supported for rotation on the frame to encircle the trunk;
   means for rotating the carriage about the trunk;
   trimming means including at least one pair of blade members positioned horizontally on the carriage in an opposed relationship locating the trunk therebetween, each blade member comprising a blade arm positioned in a non-pivoting manner within slots formed by top and bottom portions of the carriage, the slots permitting inward and outward sliding reciprocating non-articulating movement of each blade arm therein relative to the tree trunk positioned between said blade arms; and
   means coupled between end portions of each opposing blade arm to produce said inward and outward reciprocating non-articulating movement and urge said trimming means to maintain contact with said trunk, rotation of the carriage causing the trimming means to trim branch segments from the trunk.

* * * * *